(12) United States Patent
Lee (10) Patent No.: US 8,443,269 B2
(45) Date of Patent: May 14, 2013

(54) SYSTEM AND METHOD FOR HANDLING FORWARD ERROR CORRECTION CODE BLOCKS IN A RECEIVER

(75) Inventor: Sheng-Lung Lee, Tainan (TW)

(73) Assignee: Himax Media Solutions, Inc., Tainan County (TW)

( * ) Notice: Subject to any disclaimer, the term of this patent is extended or adjusted under 35 U.S.C. 154(b) by 400 days.

(21) Appl. No.: 12/939,656

(22) Filed: Nov. 4, 2010

(65) Prior Publication Data

US 2012/0117442 A1 May 10, 2012

(51) Int. Cl.
*G06F 11/00* (2006.01)
(52) U.S. Cl.
USPC .......................................... 714/786; 714/755
(58) Field of Classification Search .................. 714/755, 714/752, 750, 753, 754, 786, 782, 789, 798; 375/316, 324, 354, 355, 358
See application file for complete search history.

(56) References Cited

U.S. PATENT DOCUMENTS

| 8,179,955 B2 * | 5/2012 | Taylor et al. ................... 375/230 |
| 2007/0195905 A1 * | 8/2007 | Schatz ............................ 375/265 |

\* cited by examiner

*Primary Examiner* — Dieu-Minh Le
(74) *Attorney, Agent, or Firm* — Baker & McKenzie LLP (57) ABSTRACT

A receiver apparatus can identify a plurality of patterns corresponding to scrambled synchronization bytes of a transport stream in a number of successive signal frames containing FEC code blocks, determine a pattern distribution into which most of the patterns identified in the successive signal frames map, and generate a synchronization signal locked to a distribution of the FEC code blocks associated with the pattern distribution. With this synchronization signal, FEC code blocks can be timely handled in a reliable manner through a FEC decoder, making the receiver apparatus more efficient and robust. In other embodiments, methods of handling FEC code blocks in a receiver apparatus are also described.

20 Claims, 10 Drawing Sheets

FIG. 10

SYSTEM AND METHOD FOR HANDLING FORWARD ERROR CORRECTION CODE BLOCKS IN A RECEIVER

BACKGROUND

1. Field of the Invention

The present invention relates to digital television broadcasting, and more particularly to systems and methods for handling forward error correction code blocks in a receiver apparatus.

2. Description of the Related Art

In the Digital Terrestrial Multimedia Broadcasting (DTMB) standard, a signal frame may not always encapsulate an integer number of forward error correction (FEC) code blocks. For example, when the modulation scheme employed is 32-quadrature amplitude modulation (32-QAM) or 4-quadrature amplitude modulation Nordstrom-Robinson (4-QAM-NR), each single signal frame may respectively include 2.5 or 0.5 FEC code blocks. Accordingly, there is no guarantee that a FEC code block systematically starts in alignment with the header portion of each signal frame.

For facilitating synchronization of the FEC decoder in a receiver apparatus, one known approach consists in using system information related to a super frame that includes hundreds of signal frames. However, this approach may be inefficient as the system information related to the super frame may be corrupted owing to channel distortion. As a result, the synchronization of the FEC decoder may be adversely affected.

Therefore, there is presently a need for a system and method that can address the foregoing issues and handle FEC code blocks more efficiently in a receiver apparatus.

SUMMARY

The present application describes a system and method for handling FEC code blocks in a receiver apparatus that is compatible with the Digital Terrestrial Multimedia Broadcasting (DTMB) standard. More specifically, the receiver apparatus can identify a plurality of patterns corresponding to scrambled synchronization bytes of a transport stream in a number of successive signal frames containing FEC code blocks, determine a pattern distribution into which most of the patterns identified in the successive signal frames map, and generate a synchronization signal locked to a distribution of the FEC code blocks associated with the pattern distribution. With this synchronization signal, FEC code blocks can be timely handled in a reliable manner through the FEC decoder, making the receiver apparatus more efficient and robust.

According to one embodiment, a method of handling forward error correction (FEC) code blocks in a receiver apparatus comprises detecting a plurality of binary code portions at predetermined positions in a number of successive signal frames containing a plurality of FEC code blocks, comparing the binary code portions against a plurality of distributions of known patterns, wherein each of the distributions of known patterns represents a different distribution of scrambled synchronization bytes of a transport stream, and generating a synchronization signal locked to a distribution of the FEC code blocks that is associated with one matched distribution of the known patterns into which most of the binary code portions map.

According to another embodiment, a receiver apparatus is described. The receiver apparatus comprises a symbol de-mapping unit adapted to de-map a plurality of data symbols and output a plurality of signal frames containing forward error correction (FEC) code blocks, a FEC code block synchronizer, and a FEC decoder. The FEC code block synchronizer is adapted to identify a plurality of patterns corresponding to scrambled synchronization bytes of a transport stream in a number of successive signal frames, determine a pattern distribution into which most of the patterns identified in the successive signal frames map, and generate a synchronization signal locked to a distribution of the FEC code blocks associated with the pattern distribution. Moreover, the FEC decoder is adapted to process the FEC code blocks in a timely manner in accordance with the synchronization signal issued from the FEC code block synchronizer.

At least one advantage of the systems and methods described herein is the ability to generate a synchronization signal for processing FEC code blocks through the FEC decoder. The synchronization signal can be generated based on the positions of known patterns corresponding to the synchronization bytes of the transport packets. Since the FEC code blocks can be processed through the FEC decoder synchronously, the robustness of the receiver apparatus can be increased.

DETAILED DESCRIPTION

The present application describes a system and method for handling FEC code blocks in a receiver apparatus that is compatible with the Digital Terrestrial Multimedia Broadcasting (DTMB) standard. More specifically, the receiver apparatus can identify a plurality of patterns corresponding to scrambled synchronization bytes of a transport stream in a number of successive signal frames containing FEC code blocks, determine a pattern distribution into which most of the patterns identified in the signal frames map, and generate a synchronization signal locked to a distribution of the FEC code blocks associated with the pattern distribution. With this synchronization signal, FEC code blocks can be timely handled in a reliable manner through the FEC decoder, making the receiver apparatus more efficient and robust.

Figure 1:
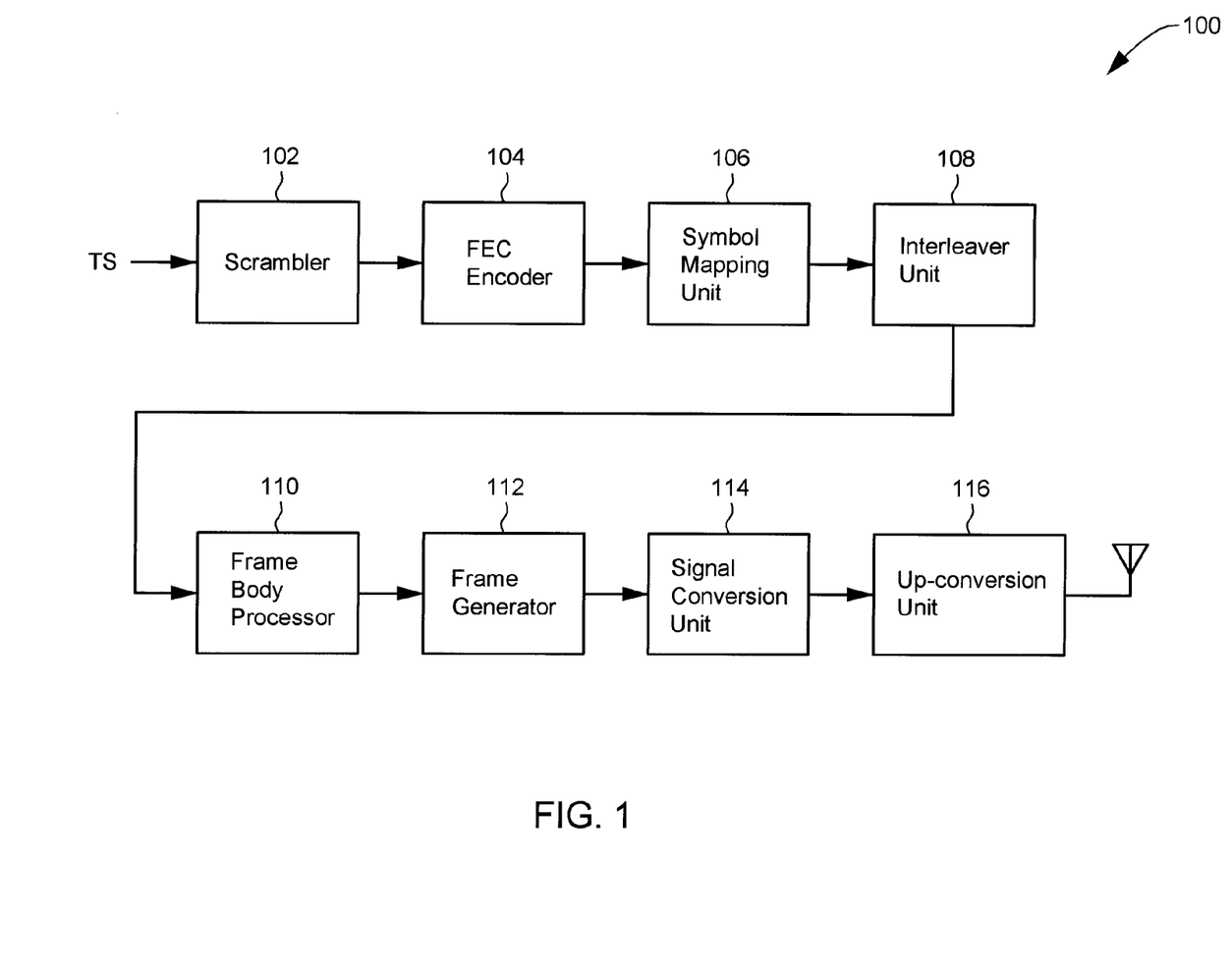
FIG. 1 is a schematic diagram illustrating one embodiment of a transmitter apparatus compatible with the DTMB standard.

FIG. 1 is a block diagram illustrating one embodiment of a transmitter apparatus 100 compatible with the DTMB standard. The transmitter apparatus 100 can comprise a scrambler 102, a forward error correction (FEC) encoder 104, a symbol mapping unit 106, an interleaver unit 108, a frame body processor 110, a frame generator 112, a signal conversion unit 114, and an up-conversion unit 116.

The scrambler 102 can receive data packets of a transport stream TS, scramble the data packets, and output a stream of scrambled binary digits. In accordance with the MPEG-2 standard, the transport stream TS can contain audio, video and other types of data. In one embodiment, the scrambler 102 can scramble the transport stream by applying an exclusive OR (XOR) operation between a pseudo-random binary sequence and the inputted digital stream.

The FEC encoder 104 can encode the stream of scrambled binary digits outputted from the scrambler 102 by applying forward error correction, and output a bit stream of FEC code blocks. As well known, FEC may typically add redundancy to the original data stream to be transmitted using a predetermined algorithm. Depending on whether the applied FEC coding scheme is systematic or nonsystematic, the original data may or may not appear in the encoded output of the FEC encoder 104. In one embodiment, the FEC encoder 104 can be a systematic FEC encoder that generates an outer code portion and an inner code portion. The outer code portion can use the Bose-Chaudhuri-Hochquenghem (BCH) code as coding scheme, and the inner code portion can use low-density parity check (LDPC) code as coding scheme. The stream of FEC code blocks outputted from the FEC encoder 104 are then inputted to the symbol mapping unit 106.

The symbol mapping unit 106 can demutiplex the received data stream into multiple parallel streams, and map each stream to a stream of data symbols using a selected modulating scheme. In accordance with the DTMB standard, the modulating scheme applied by the symbol mapping unit 106 can include 64-quadrature amplitude modulation (64-QAM), 32-quadrature amplitude modulation (32-QAM), 16-quadrature amplitude modulation (16-QAM), 4-quadrature amplitude modulation (4-QAM), and 4-quadrature amplitude modulation Nordstrom-Robinson (4-QAM-NR).

The interleaver unit 108 can receive data symbols outputted by the symbol mapping unit 106, modifies the order of the symbols, and output interleaved data symbols. While the illustrated embodiment places the interleaver unit 108 after the symbol mapping unit 106, alternate embodiments may also dispose the interleaver unit 108 upstream of the symbol mapping unit 106. The interleaved data symbols can be then processed through the frame body processor 110.

The frame body processor 110 can apply Inverse Fast Fourier Transform (IFFT) or Inverse Discrete Fourier Transform (IDFT) on the interleaved data symbols to obtain time-domain data symbols, and process the data symbols to form a plurality of frame bodies.

The frame generator 112 can multiplex the data symbols of the frame bodies with symbols of frame header and system information for forming a plurality of signal frames. Frame header information may include a code sequence used for synchronizing each frame. This code sequence can include, for example, a pseudorandom noise (PN) sequence. System information may include necessary information for a receiver apparatus to process the data, such as the applied modulating scheme (e.g., 64-QAM, 32-QAM, 16-QAM, 4-QAM, 4-QAM-NR), FEC coding (e.g., BCH, LDPC), etc.

The signal conversion unit 114 can include a digital-to-analog converter (DAC) that converts the signal stream conveying the signal frames into an analog signal, and the up-conversion unit 116 can perform up-conversion for generating a radio-frequency (RF) signal. The RF signal can then be transmitted via an antenna from the transmitter apparatus 100 to a receiver apparatus.

Figure 2:
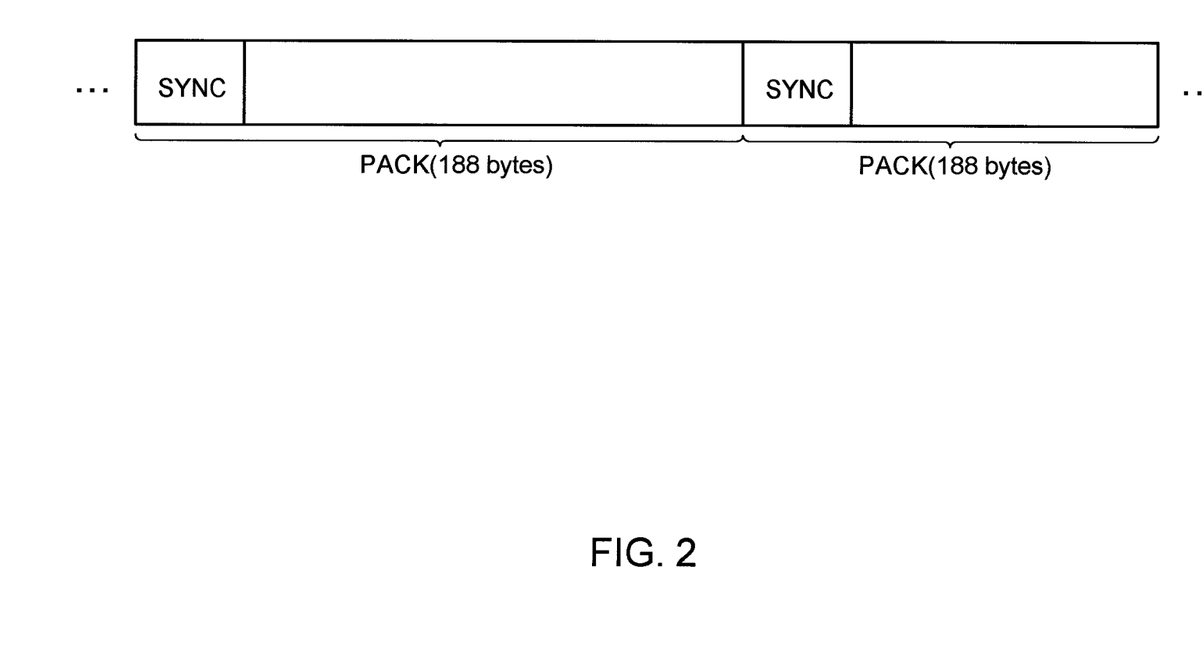
FIG. 2 is a simplified diagram illustrating the format of data packets PACK inputted to a scrambler of the transmitter apparatus.

FIG. 2 is a simplified diagram illustrating the format of data packets PACK inputted to the scrambler 102. In accordance with the MPEG-2 standard, each data packet PACK of a transport stream TS may have a length of 188 bytes with a synchronization byte SYNC of a predetermined pattern in the packet header, usually the value 0x47 (Hexadecimal format). The synchronization byte SYNC, which should repeatedly appear at known positions in the transport stream every 188 bytes, can be typically used for finding packet boundaries. The data packets PACK can be scrambled via the scrambler 102, and grouped into blocks on which FEC codes are applied by the FEC encoder 104 for generating FEC code blocks.

Figure 3:
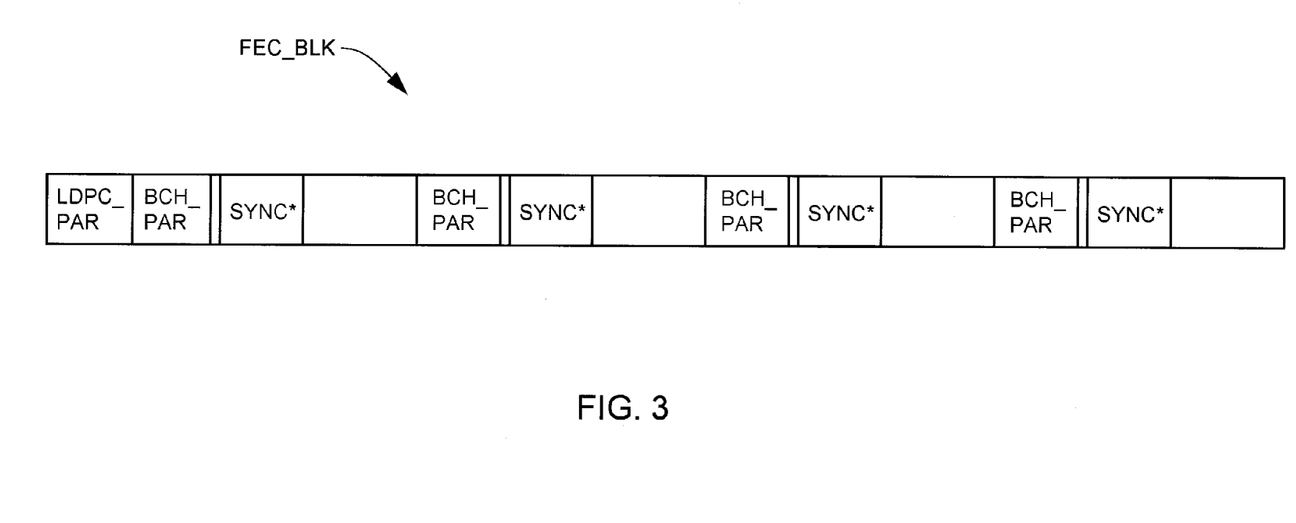
FIG. 3 is a simplified diagram illustrating the content of a FEC code block.

FIG. 3 is a simplified diagram illustrating the content of a FEC code block FEC_BLK. Each FEC code block FEC_BLK can encapsulate and encode information from multiple data packets PACK. In one FEC code block FEC_BLK, reference symbol SYNC* designates the binary code portion corresponding to the synchronization byte SYNC after it is scrambled via the scrambler 102, reference symbol BCH_PAR designates the parity code incorporated after application of the Bose-Chaudhuri-Hochquenghem code, and reference symbol LDPC_PAR designates the parity code incorporated after application of the LDPC code. The parity codes BCH_PAR and LDPC_PAR respectively have fixed lengths. Suppose that the FEC encoder 104 applies systematic encoding of a fixed length, the binary code portions SYNC* and their positions remain unchanged after being processed through the FEC encoder 104, respectively corresponding to the position of the synchronization bytes SYNC. Moreover, for a given modulation scheme, each FEC code block FEC_BLK can invariably include a same number of binary code portions SYNC* disposed at the same positions (e.g., four SYNC* per FEC code block for a code rate of 0.8). With the scrambler 102 resetting at the beginning of each signal frame, the binary code portions SYNC* and their respective positions (i.e., corresponding to the positions of the synchronization byte SYNC) can accordingly be known in advance in each signal frame. In one embodiment, the positions of these known patterns SYNC* in each signal frame can be tracked at the receiver apparatus to synchronize the reverse decoding operation applied on the FEC code blocks.

Figure 4:
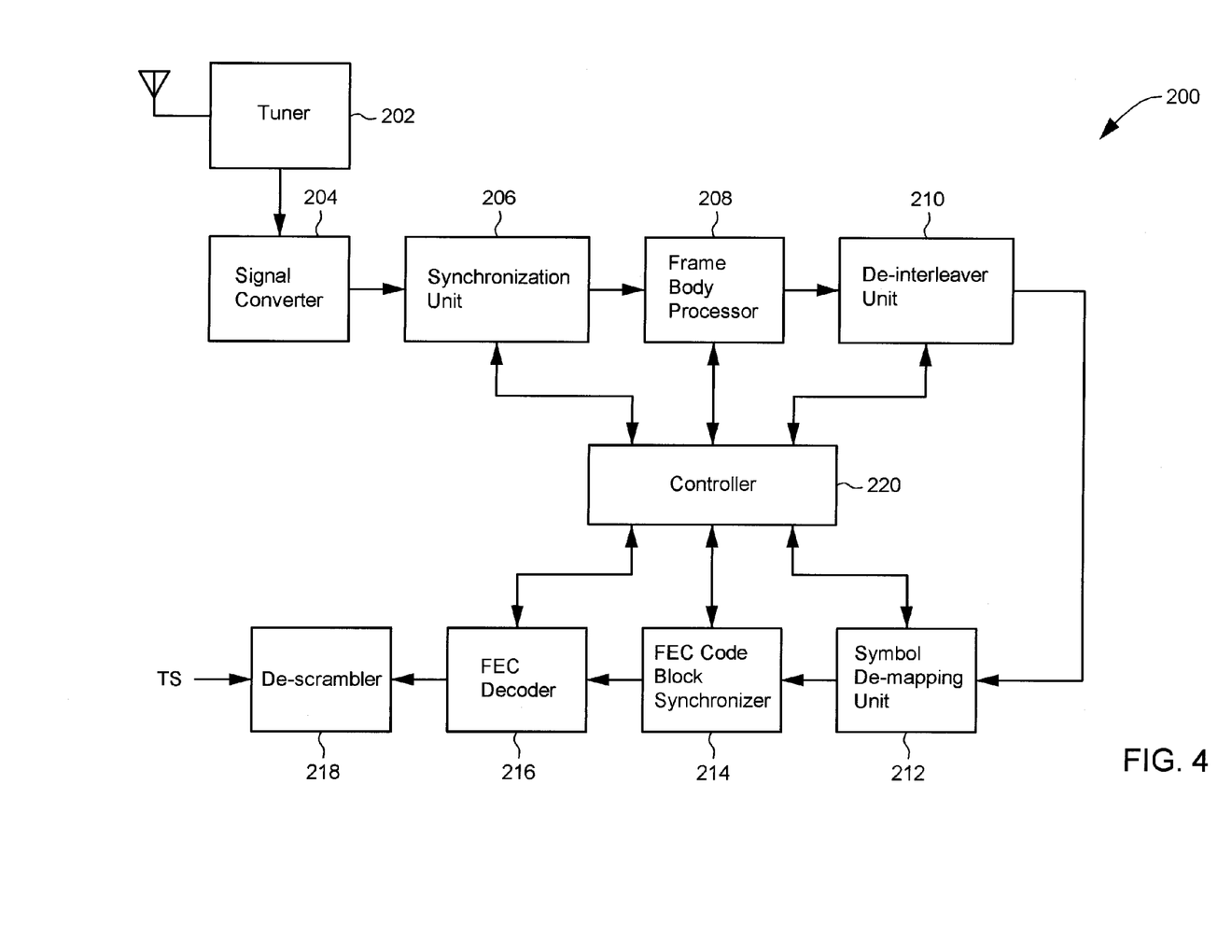
FIG. 4 is a block diagram illustrating one embodiment of a receiver apparatus.

FIG. 4 is a block diagram illustrating one embodiment of a receiver apparatus 200. The receiver apparatus 200 can include a tuner 202, a signal converter 204, a synchronization unit 206, a frame body processor 208, a de-interleaver unit 210, a symbol de-mapping unit 212, a FEC code block synchronizer 214, a FEC decoder 216, a descrambler 218 and a controller 220.

The tuner 202 can amplify an analog RF signal received via the antenna, down-convert the RF signal to a base-band signal, and filter the base-band signal.

The signal converter 204 can adjust the gain of a received signal, and may comprise an analog-to-digital converter (ADC) for converting the received signal into a digital form. The output of the signal converter 204 can be supplied to the synchronization unit 206.

The synchronization unit 206 can be adapted to synchronize a plurality of signal frames from the received signal. More specifically, the synchronization unit 206 can use the PN sequence embedded in the signal outputted from the signal converter 204 for finding a head of each frame, extract system information and send it to the controller 220, and transmit a data signal conveying the frames to the frame body processor 208 in a synchronized manner.

The frame body processor 208 can convert data symbols from the received signal from the time domain to the frequency domain by applying Fast Fourier Transform (FFT) or Discrete Fourier Transform (DFT). In addition, the frame body processor 208 may comprise an equalizer that remove noise from the data symbols to compensate for channel distortion. The output of the frame body processor 208 can accordingly include a number of parallel streams in the frequency domain, which are then processed through the de-interleaver unit 210 that de-interleaves data symbols on a block basis.

The symbol de-mapping unit 212 can de-map the data symbols outputted from the de-interleaver unit 210 by using a demodulation scheme associated with the modulation scheme applied by the transmitter apparatus 100. The modulation scheme applied by the transmitter apparatus 100 may be determined from system information stored at the controller 220. As described previously, the applied modulation scheme may comprise 64-QAM, 32-QAM, 16-QAM, 4-QAM, and 4-QAM-NR.

The FEC code block synchronizer 214 can receive system information from the controller 220, and a bit stream from the symbol de-mapping unit 212 conveying signal frames. Depending on the modulation/demodulation scheme described in the system information, the FEC code block synchronizer 214 can identify binary code portions corresponding to the known patterns SYNC* in a number of multiple successive signal frames, determine a pattern distribution into which most of the identified patterns SYNC* map, and generate a synchronization signal locked to a distribution of the FEC code blocks associated with the pattern distribution. The FEC code block synchronizer 214 can then send the synchronization signal to the FEC decoder 216 so that FEC code blocks can be processed through the FEC decoder 216 in a synchronized manner.

The FEC decoder 216 can decode the FEC code blocks according to the FEC encoding method applied at the transmitter apparatus 100, detect and correct errors that may have been introduced during transmission, and output a stream of decoded binary digits. As described previously, the FEC encoding/decoding method may include BCH and LDPC codes, for example. The stream of decoded binary digits can be then processed through the descrambler 218 to recover the transport stream packets.

Figure 5:
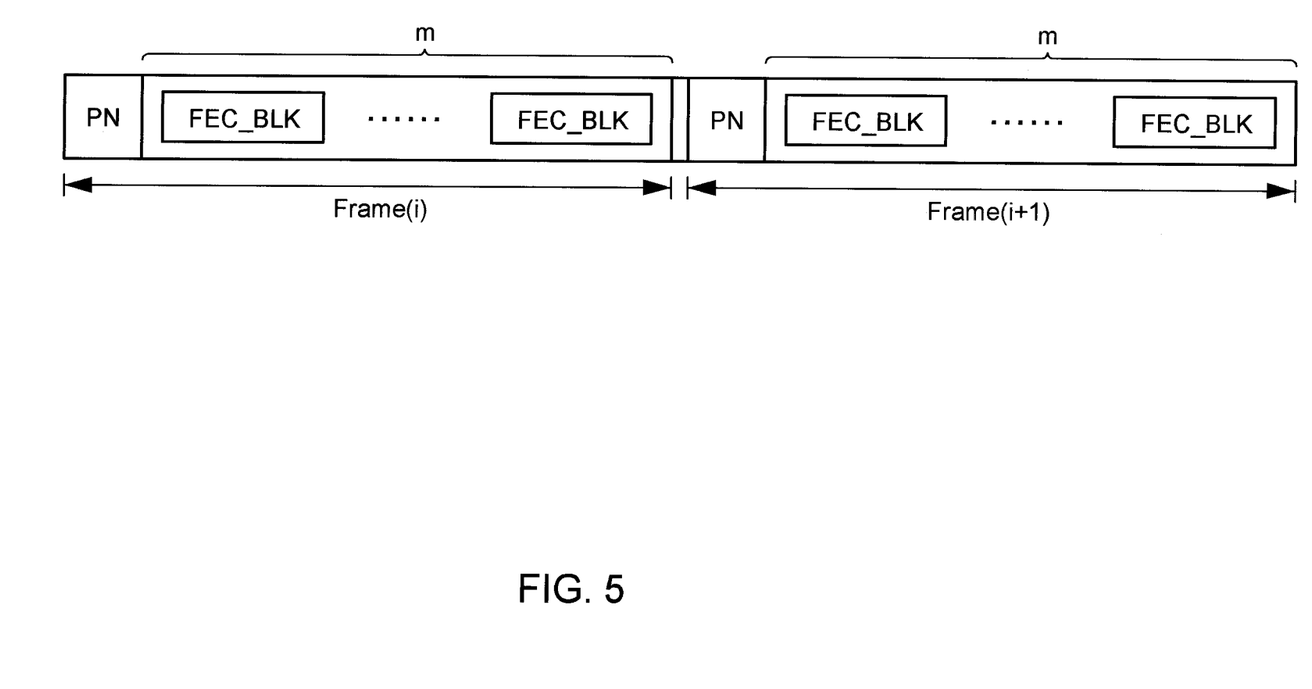
FIG. 5 is a simplified diagram illustrating a distribution of FEC code blocks through successive frames.

FIG. 5 is a simplified diagram illustrating a distribution of FEC code blocks through successive signal frames (i) and (i+1). Each frame may start with a PN sequence and include an amount "m" of entire FEC code blocks FEC_BLK, wherein "m" is an integer. This is the case for 64-QAM (m equal to 3), 16-QAM (m equal to 2), and 4-QAM (m equal to 1). When these modulation schemes are applied, the FEC code blocks FEC_BLK are distributed in a same manner through each successive signal frame (i) and (i+1), the head of one entire FEC code block similarly starting adjacent after each PN sequence.

Figure 6:
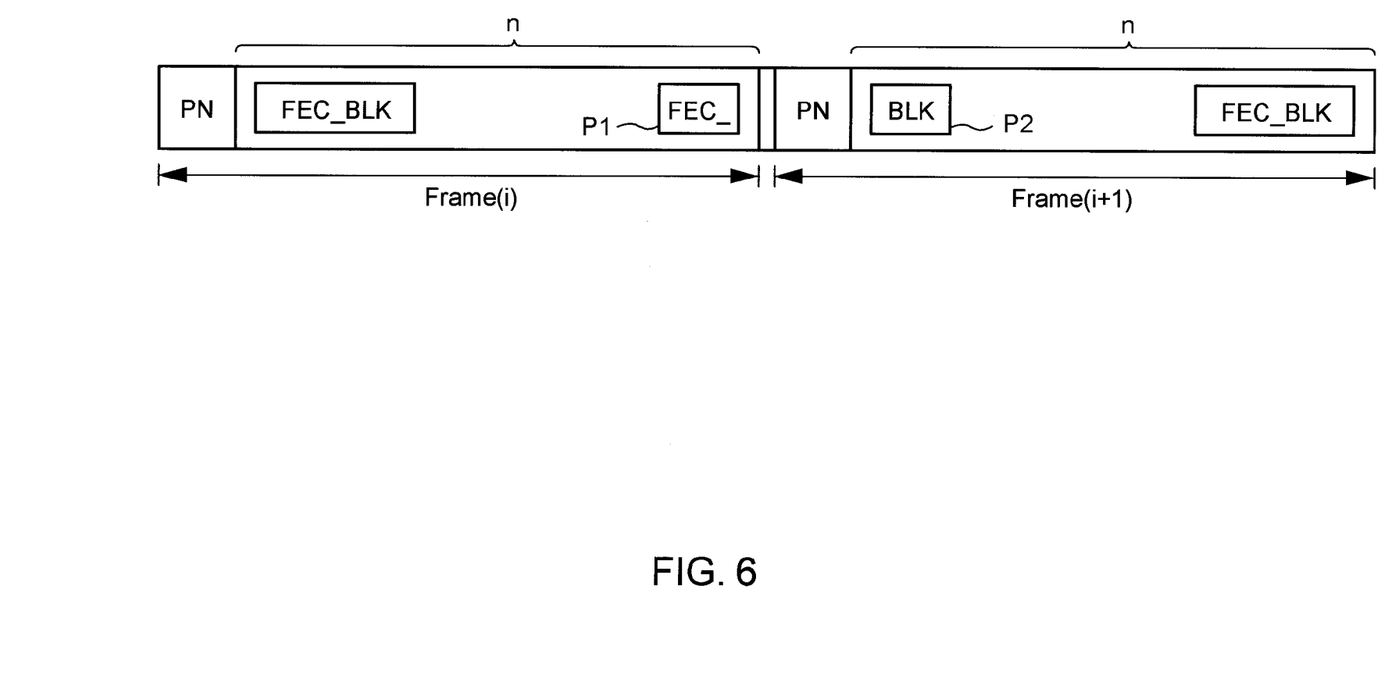
FIG. 6 is a simplified diagram illustrating another possible distribution of FEC code blocks through successive frames.

FIG. 6 is a simplified diagram illustrating another possible distribution of FEC code blocks through successive signal frames (i) and (i+1). Each frame may start with a PN sequence and include an amount "n" of FEC code blocks FEC_BLK, wherein "n" is a decimal number. This is the case for 32-QAM (n equal to 2.5), 4-QAM-NR (n equal to 0.5). When these modulation schemes are applied, the FEC code blocks FEC_BLK are distributed differently through two successively adjacent signal frames, e.g., one FEC code block FEC_BLK may be split into a first portion P1 located at the tail of the preceding frame (i) and a second portion P2 located at the beginning of the following frame (i+1). Accordingly, the head of one new FEC code block may not systematically start adjacently after the header portion of each successive signal frame. In these cases, proper synchronization is needed for notifying the FEC decoder 216 of the correct start of each FEC code block.

Figure 7:
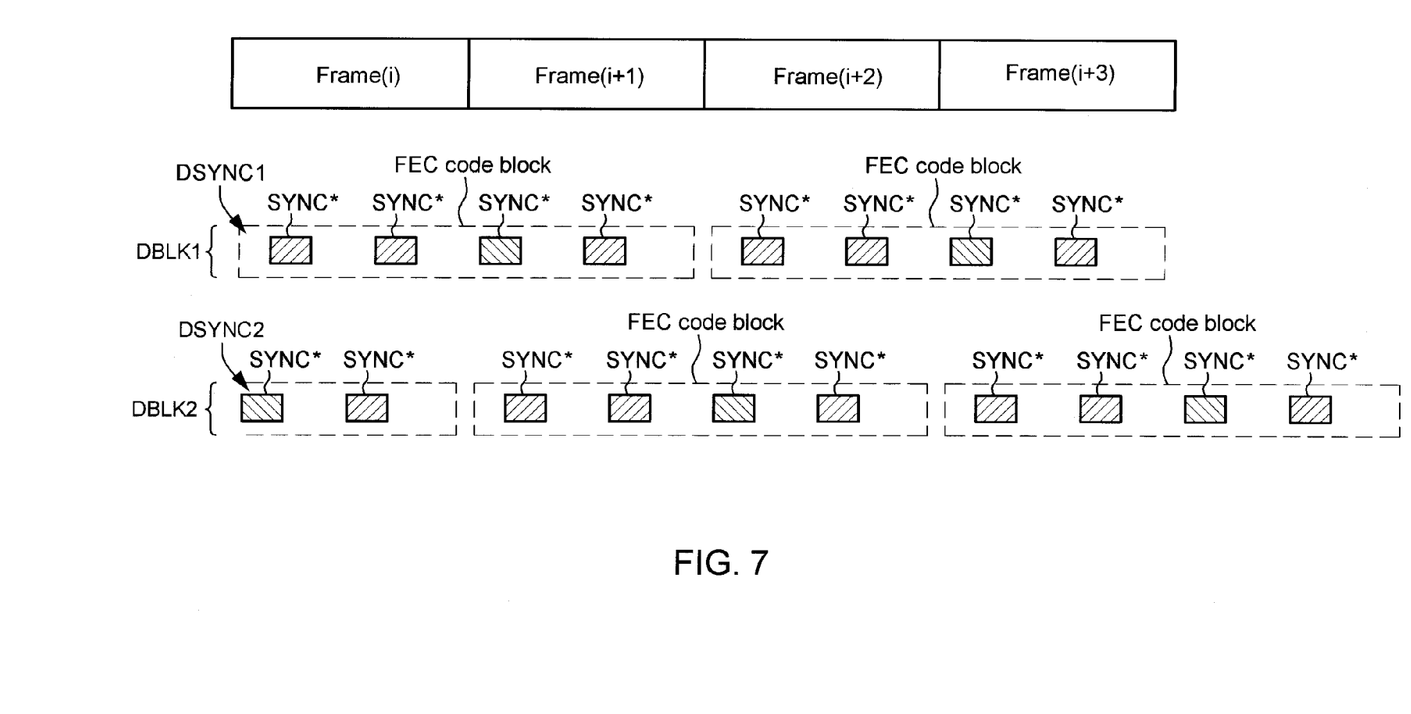
FIG. 7 is a simplified diagram illustrating how successive frames can be processed for generating a synchronization signal used for handling the FEC code blocks.
Figure 8:
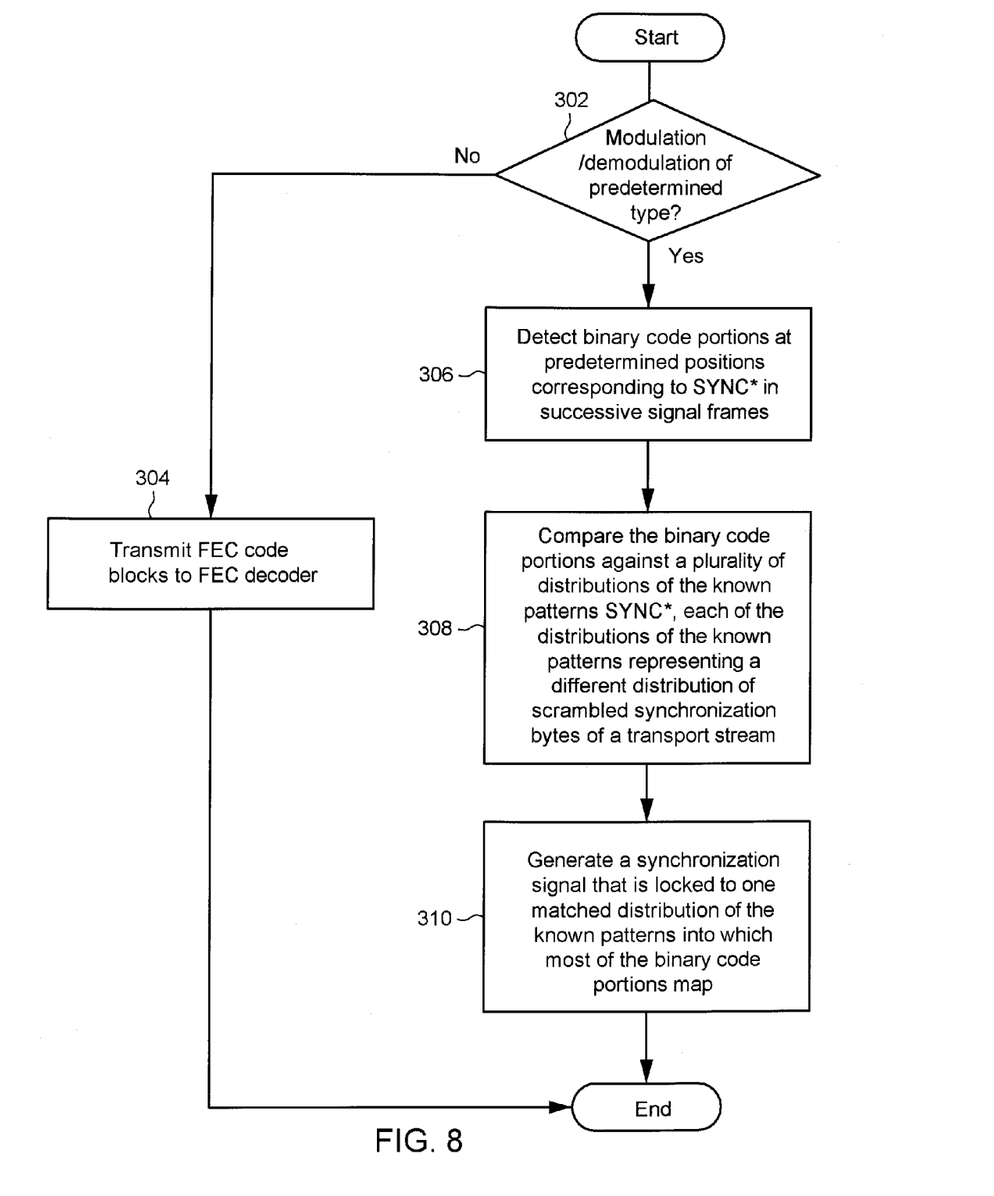
FIG. 8 is a flowchart illustrating a method for generating a synchronization signal used for handling the FEC code blocks.

FIG. 7 is a simplified diagram illustrating how successive signal frames can be processed for generating a synchronization signal used for handling the FEC code blocks. In conjunction with FIG. 7, FIG. 8 is a flowchart illustrating a method implemented through the FEC code block synchronizer 214 for generating a synchronization signal for properly handling the FEC code blocks. In step 302, the FEC code block synchronizer 214 can determine from the system information whether the applied modulation/demodulation scheme is of a predetermined type (e.g., 32-QAM or 4-QAM-NR). If it is not the case, the FEC code block synchronizer 214 in step 304 may directly transmit the FEC code blocks to the FEC decoder 216.

If the applied modulation matches with the predetermined type, the FEC code block synchronizer 214 in step 306 can detect a plurality of binary code portions at predetermined positions in a number of inputted successive signal frames containing a plurality of FEC code blocks. The predetermined positions of the detected binary code portions correspond to the positions of the known patterns SYNC* (i.e., corresponding to the scrambled TS synchronization bytes as shown in FIG. 3).

In step 308, the FEC code block synchronizer 214 can compare the binary code portions against a plurality of distributions of the known patterns SYNC*, wherein each of the distributions of the known patterns SYNC* represents a different distribution of scrambled synchronization bytes of the transport stream TS in the signal frames. For example, FIG. 7 exemplary illustrates two distributions DSYNC1 and DSYNC2 of the known patterns SYNC* that are possible for 4-QAM-NR. For illustration only, suppose that each FEC code block contain 4 patterns SYNC*, and each frame contains 0.5 FEC code block, there may be about two of the known patterns SYNC* per each frame. The distributions of the known patterns SYNC* DSYNC1 and DSYNC2 illustrated in FIG. 7 are associated with the possible distributions of FEC code blocks DBLK1 and DBLK2 for the applied modulation scheme. It is worth noting that step 308 may be performed either after step 306 or in parallel with step 306.

In step 310, the FEC code block synchronizer 214 can then generate a synchronization signal that is locked to one matched distribution of the known patterns SYNC* into which most of the identified binary code portions map. For example, suppose that most of the identified binary code portions map into the pattern distribution DSYNC1, the synchronization signal can be accordingly locked to the first distribution of the FEC code blocks DBLK1 associated with the pattern distribution DSYNC1, as shown in FIG. 7. If most of the identified binary code portions map into the distribution DSYNC2, the synchronization signal can be locked to the second distribution of the FEC code blocks DBLK2 associated with the distribution DSYNC2. Based on the synchronization signal, the FEC decoder 216 can accordingly receive FEC code blocks in a synchronized manner for applying decoding operation.

Figure 9:
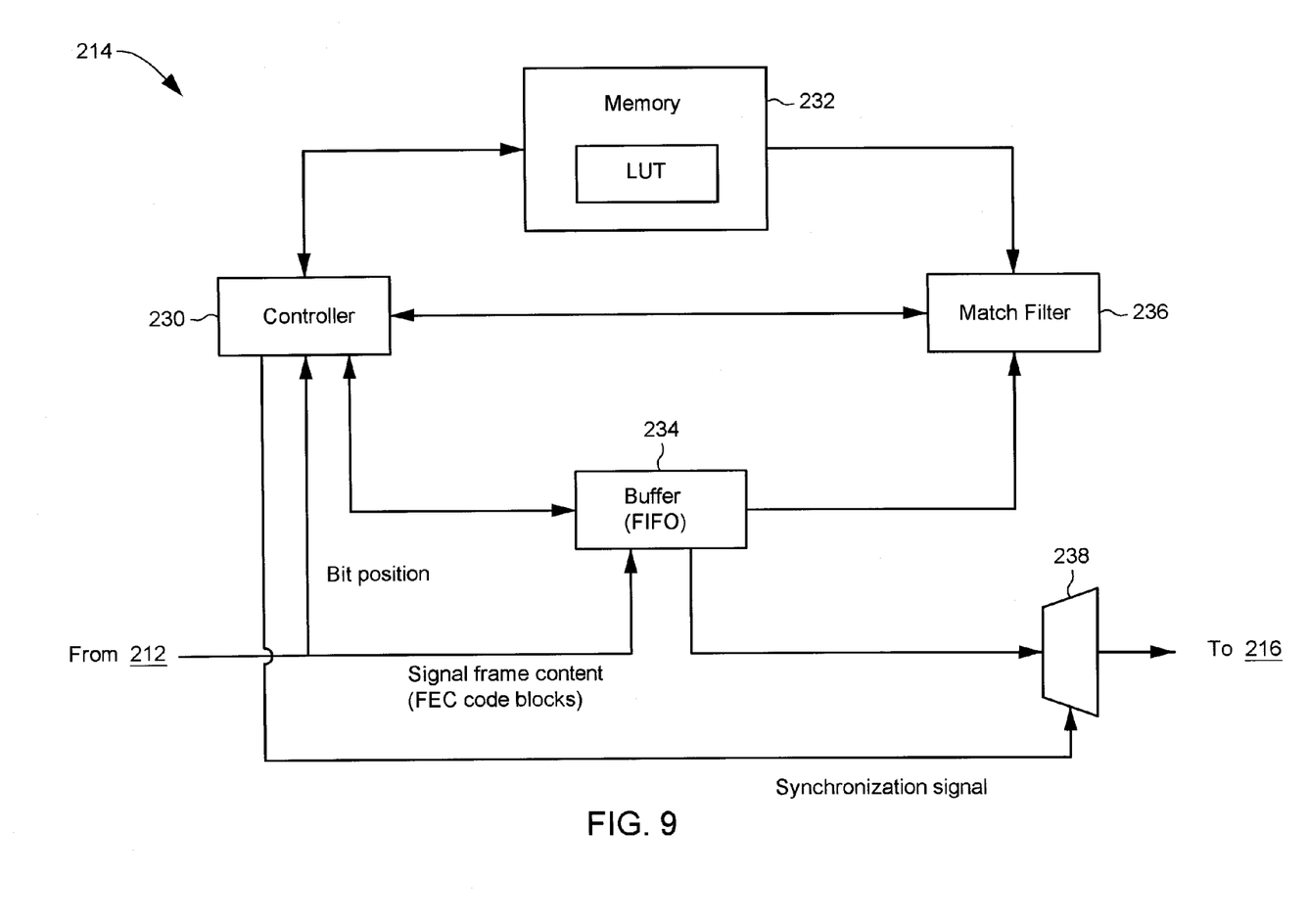
FIG. 9 is a schematic diagram illustrating one embodiment of the FEC code block synchronizer.

Any hardware implementations may be possible for the FEC code block synchronizer 214. FIG. 9 is a schematic diagram illustrating one exemplary embodiment of the FEC code block synchronizer 214. The FEC code block synchronizer 214 can comprise a controller 230, a memory 232, a buffer 234, a match filter 236 and a control switch 238. The controller 230 can receive a bit stream of signal frames BS from the symbol de-mapping unit 212 and bit position information associated with the bit stream BS, send enable signals to the match filter 236, track the results of the match filter 236, and generate a synchronization signal.

The memory 232 can include read-only memory (ROM). The memory 232 can store a look-up table LUT describing the predetermined bit positions of the known patterns SYNC* (i.e., corresponding to the positions of the synchronization bytes SYNC) in the signal frames for different pattern distributions (e.g., the pattern distributions DSYNC1 and DSYNC2 described previously). The buffer 234 can be a first-in-first-out (FIFO) buffer that temporarily stores the content of signal frames (e.g., FEC code blocks) outputted from the symbol de-mapping unit 212.

The match filter 236 can receive an enable signal from the controller 230 and synchronization position information from the memory 232, and determine whether a binary code portion of a FEC code block stored in the buffer 234 matches with one known pattern SYNC*, and accordingly output a result to the controller 230.

Based on the synchronization signal issued from the controller 230, the control switch 238 can output a FEC code block to the FEC decoder 216 in a timely manner.

Figure 10:
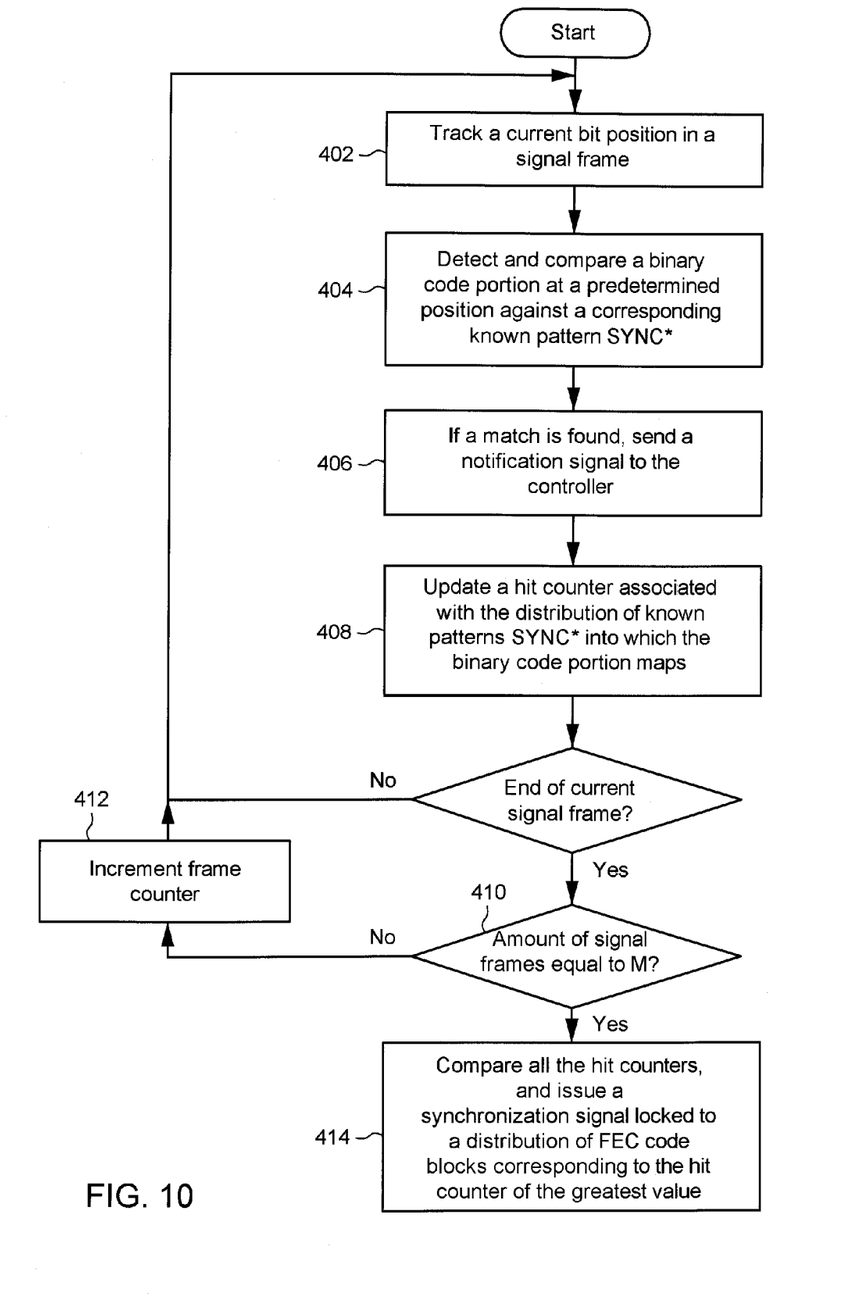
FIG. 10 is a flowchart illustrating method steps performed by the FEC code block synchronizer shown in FIG. 9.

FIG. 10 is a flowchart of method steps performed by the embodiment of the FEC code block synchronizer 214 shown in FIG. 9. For clarity, the method steps are exemplary described in conjunction with the modulation/demodulation scheme 4-QAM-NR as shown in FIG. 7. However, the method steps may be applicable for any modulation/demodulation schemes. In step 402, the controller 230 can track a current bit position in a signal frame received from the symbol de-mapping unit 212. In step 404, when the current bit position corresponds to a predetermined position of a known pattern SYNC* recorded in the look-up table LUT, the controller 230 issues an enable signal to the match filter 236, and the match filter 236 accordingly detects and compares the binary code portion at the predetermined position against the corresponding known pattern SYNC*.

In step 406, if a match is found, the match filter 236 sends a notification signal to the controller 230. In particular, according to the position of the matched pattern SYNC*, the notification signal can indicate which of the distributions of the known patterns (e.g., first or second distribution DSYNC1 and DSYNC2 as shown in FIG. 7) have been hit.

Based on the notification signal, the controller in step 408 can then update a hit counter associated with the distribution of the known patterns SYNC* into which the current binary code portion under comparison has successfully mapped. For example, a first hit counter CNT1 associated with the first distribution DSYNC1 (i.e., corresponding to the first distribution of FEC code blocks DBLK1) may be incremented by 1 when the binary code portion under comparison has mapped to the first distribution DSYNC1, whereas a second hit counter CNT2 associated with the second distribution DSYNC2 (i.e., corresponding to the second distribution of FEC code blocks DBLK2) may be incremented by 1 when the binary code portion under comparison has mapped to the second distribution DSYNC2. Steps 402 through 408 are repeated for attempting to map one at a time the successive binary code portions at each of the predetermined positions tracked in the look-up table LUT until one entire signal frame is considered.

In step 410, once one entire signal frame has been processed, the controller 230 can then determine whether the amount of considered signal frames is equal to a predetermined value M (for example 3). If it is not the case, a frame counter is incremented by one in step 412, and steps 402 through 408 can be repeated again for a next signal frame. If the amount of considered frames is equal to M, the controller 230 in step 414 can compare all the hit counters, and issue a synchronization signal that is locked to a distribution of FEC code blocks corresponding to the hit counter of the greatest value. For example, the issued synchronization signal can be respectively locked to the first distribution of FEC code blocks DBLK1 in case the first hit counter CNT1 is greater than the second hit counter CNT2, and to the second distribution of FEC code blocks DBLK2 in case the second hit counter CNT2 is greater than the first hit counter CNT1. Subsequently, the FEC code blocks can be processed through the FEC decoder 216 in accordance with the synchronization signal.

At least one advantage of the system and method described herein is the ability to generate a synchronization signal for processing FEC code blocks through the FEC decoder. The synchronization signal can be generated based on the positions of known patterns corresponding to the synchronization bytes of the transport packets. Since the FEC code blocks can be processed through the FEC decoder synchronously, the robustness of the receiver apparatus can be increased.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

What is claimed is:

1. A method of handling forward error correction (FEC) code blocks in a receiver apparatus, comprising:
    detecting a plurality of binary code portions at predetermined positions in a number of successive signal frames containing a plurality of FEC code blocks;
    comparing the binary code portions against a plurality of distributions of known patterns, wherein each of the distributions of known patterns represents a different distribution of scrambled synchronization bytes of a transport stream; and
    generating a synchronization signal locked to a distribution of the FEC code blocks that is associated with one matched distribution of the known patterns into which most of the binary code portions map.

2. The method according to claim 1, wherein the scrambled synchronization bytes are obtained by scrambling a synchronization byte having the value 0×47.

3. The method according to claim 1, wherein the predetermined positions correspond to the positions of the scrambled synchronization bytes.

4. The method according to claim 1, wherein each of the distributions of the known patterns is associated with a different hit counter.

5. The method according to claim 4, wherein the step of comparing the binary code portions against a plurality of distributions of known patterns comprises:
    sequentially comparing the binary code portions one at a time; and each time one of the binary code portions is mapped to one of the distributions of the known patterns, incrementing the associated hit counter.

6. The method according to claim 5, wherein the hit counter of the matched distribution of the known patterns has the greatest value among all of the hit counters.

7. The method according to claim 1, wherein each of the FEC code blocks is encoded via a systematic encoding scheme including an outer coding portion and an inner coding portion.

8. The method according to claim 7, wherein the outer coding portion includes Bose-Chaudhuri-Hochquenghem code.

9. The method according to claim 7, wherein the inner code portion includes low density parity check (LDPC) code.

10. A method of processing data in a receiver apparatus compatible with the DMTB standard, comprising:
   determining a modulating scheme of a plurality of encoded data received by the receiver device; and
   when the modulating scheme is a 32-quadrature amplitude modulation (32-QAM) or a 4-quadrature amplitude modulation Nordstrom-Robinson (4-QAM-NR), performing the method of claim 1.

11. A method of handling forward error correction (FEC) code blocks in a receiver apparatus, comprising:
   identifying a plurality of patterns corresponding to scrambled synchronization bytes of a transport stream in a number of successive signal frames containing FEC code blocks;
   determining a pattern distribution into which most of the patterns identified in the successive signal frames map; and
   generating a synchronization signal locked to a distribution of the FEC code blocks associated with the pattern distribution.

12. The method according to claim 11, wherein the step of determining a pattern distribution into which most of the patterns identified in the successive signal frames maps further comprises:
   storing information describing a plurality of pattern distributions for the patterns;
   associating a hit counter with each of the pattern distributions;
   determining whether each of the identified patterns maps into any of the pattern distributions; and
   for each identified pattern that is mapped into one of the pattern distributions, increment the associated hit counter.

13. A receiver apparatus comprising:
   a symbol de-mapping unit adapted to de-map a plurality of data symbols and output a plurality of signal frames containing forward error correction (FEC) code blocks;
   a FEC code block synchronizer adapted to
      identify a plurality of patterns corresponding to scrambled synchronization bytes of a transport stream in a number of successive signal frames;
      determine a pattern distribution into which most of the patterns identified in the successive signal frames map; and
      generate a synchronization signal locked to a distribution of the FEC code blocks associated with the pattern distribution; and
   a FEC decoder adapted to process the FEC code blocks in accordance with the synchronization signal.

14. The receiver apparatus according to claim 13, wherein the scrambled synchronization bytes are obtained by scrambling a synchronization byte having the value 0×47.

15. The receiver apparatus according to claim 13, wherein the FEC code block synchronizer includes a match filter adapted to determine whether a binary code portion at a predetermined position in a signal frame matches with one of the patterns.

16. The receiver apparatus according to claim 13, wherein the FEC code block synchronizer includes:
   a memory for storing information describing a plurality of pattern distributions for the patterns; and
   a match filter adapted to determine whether each of the identified patterns in the signal frame maps into any of the pattern distributions.

17. The receiver apparatus according to claim 16, wherein the FEC code block synchronizer further includes:
   a controller adapted to
      associate a hit counter with each of the pattern distributions; and
      for each identified pattern that is mapped into one of the pattern distributions, increment the associated hit counter; and
      generate the synchronization signal locked to a distribution of the FEC code blocks that is associated with the pattern distribution having the greatest value in the hit counter.

18. The receiver apparatus according to claim 13, wherein each of the FEC code blocks is encoded via a systematic encoding scheme including an outer coding portion and an inner coding portion.

19. The receiver apparatus according to claim 18, wherein the outer coding portion includes Bose-Chaudhuri-Hochquenghem code.

20. The receiver apparatus according to claim 18, wherein the inner code portion includes low density parity check (LDPC) code.

* * * * *